United States Patent
Leung et al.

(10) Patent No.: US 8,982,101 B2
(45) Date of Patent: Mar. 17, 2015

(54) OPTICAL TOUCH SYSTEM AND OPTICAL TOUCH-POSITION DETECTION METHOD

(71) Applicant: Quanta Computer Inc., Kuei Shan Hsiang, Tao Yuan Shien (TW)

(72) Inventors: Chee-Chun Leung, Tao Yuan Shien (TW); Yun-Cheng Liu, Tao Yuan Shien (TW); Chien-Hung Lin, Tao Yuan Shien (TW)

(73) Assignee: Quanta Computer Inc., Guishan Dist., Taoyuan (TW)

( * ) Notice: Subject to any disclaimer, the term of this patent is extended or adjusted under 35 U.S.C. 154(b) by 222 days.

(21) Appl. No.: 13/764,270

(22) Filed: Feb. 11, 2013

(65) Prior Publication Data

US 2013/0241883 A1 Sep. 19, 2013

(30) Foreign Application Priority Data

Mar. 19, 2012 (TW) .............................. 101109281 A (51) Int. Cl.
*G06F 3/042* (2006.01)
*G06F 3/041* (2006.01)

(52) U.S. Cl.
CPC ............ *G06F 3/0425* (2013.01); *G06F 3/0418* (2013.01); *G06F 3/0428* (2013.01)
USPC ........................................................ 345/175

(58) Field of Classification Search
CPC ... G06F 3/0425; G06F 3/0428; G06F 3/0421; G06F 3/042; G06F 3/0418
USPC ................................... 345/173–179
See application file for complete search history.

(56) References Cited

U.S. PATENT DOCUMENTS

| | | | |
|---|---|---|---|
| 2008/0062149 A1 | 3/2008 | Baruch | |
| 2008/0111797 A1* | 5/2008 | Lee | ................................. 345/175 |
| 2009/0185228 A1* | 7/2009 | Li et al. | ........................ 358/3.06 |
| 2012/0092242 A1* | 4/2012 | Wendt et al. | .................. 345/102 |

OTHER PUBLICATIONS

Taiwanese language office action dated Jun. 24, 2014.

* cited by examiner

*Primary Examiner* — Michael Pervan
*Assistant Examiner* — Andrew Lee
(74) *Attorney, Agent, or Firm* — McClure, Qualey & Rodack, LLP (57) ABSTRACT

The invention provides an optical touch system, including a camera having a lens and an image sensor to capture an image of a touch object on the image sensor through the lens, an active light source for lighting the touch object, and a processor for determining the distance between the touch object and the camera according to the size of the image or the brightness of the image on the image sensor, determining the direction of the touch object according to the position of the image on the image sensor, and calculating the position of the touch object.

12 Claims, 8 Drawing Sheets

OPTICAL TOUCH SYSTEM AND OPTICAL TOUCH-POSITION DETECTION METHOD

CROSS REFERENCE TO RELATED APPLICATIONS

This Application claims priority of Taiwan Patent Application No. 101109281, filed on Mar. 19, 2012, the entirety of which is incorporated by reference herein.

BACKGROUND OF THE INVENTION

1. Field of the Invention

The present invention relates to an optical touch system and an optical touch-position detection method, and in particular relates to an optical touch system and an optical touch-position detection method adopting a camera to detect the distance and direction of a touch object.

2. Description of the Related Art

Touch techniques applied in displays include not only embedding a capacitive or inductive touch panel into a display device, but also disposing a camera provided with an image sensor to the periphery of the display device to optically detect touch positions.

In a conventional optical touch technique, two cameras are used and disposed at different corners of the touch surface such that the fields of view (FOV) of the two cameras both cover the entire touch surface. The touch position of a touch object at the touch surface is determined by the intersection point of the lines passing through the touch object and the two cameras.

Figure 1:
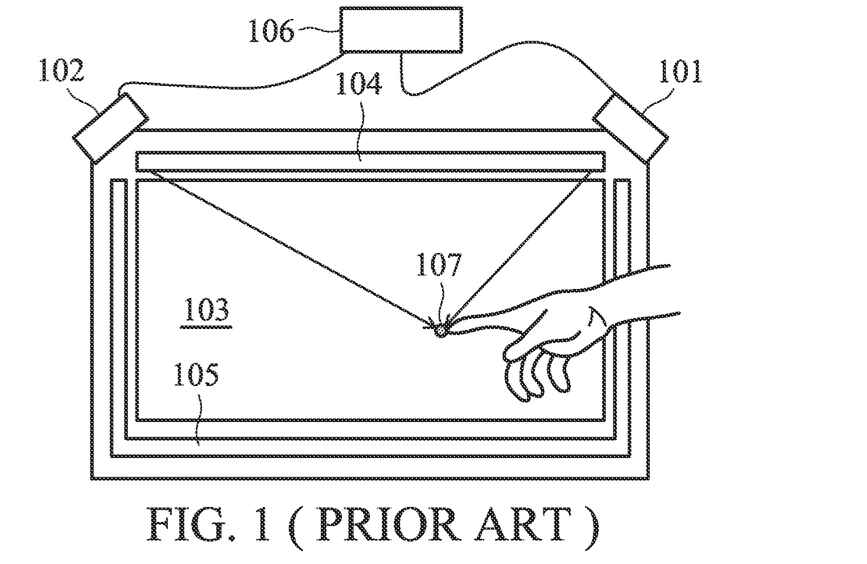
FIG. 1 is a configuration diagram showing a conventional optical touch system.

As shown in FIG. 1, camera 101 and 102 are disposed at two corners of the touch area 103 such that the fields of view of the two cameras 101 and 102 both cover the entire touch area 103. A linear light source 104 and a retro-reflector 105 are further disposed at the boundary of the touch area 103. The retro-reflector 105 is located along three edges of the touch area 103 and is capable of reflecting any incident light beam back along its incident direction. Therefore, when the linear light source 104 lightens the entire touch area 103, the light beams are reflected by the retro-reflector 105 to the cameras 101 and 102. In this case, when a touch object touches the touch area 103 to produce a touch point 107, the touch object blocks the reflecting light beams of the directions through the touch point 107 and the cameras 101 and 102, and accordingly the cameras 101 and 102 respectively obtain a dark point at a position on the pixel array of an image sensor provided in the cameras 101 and 102. Finally, a processor 106 acquires the directions of the touch point 107 with respect to the cameras 101 and 102 and calculates the real position of the touch point 107, according to the positions of the dark points on the pixel arrays of the image sensors.

In addition, the conventional optical touch techniques also include a structure wherein a camera and a mirror are disposed at the periphery of the touch surface.

Figure 2:
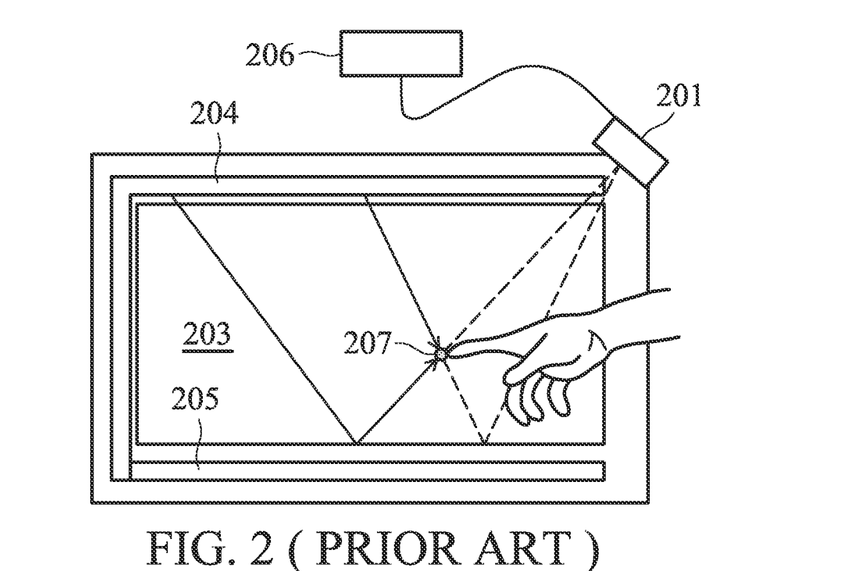
FIG. 2 is a configuration diagram showing another conventional optical touch system.

As shown in FIG. 2, a camera 201 is disposed at a corner of a touch area 203 such that the field of view of the camera 201 covers the entire touch area 203. Further, a linear light source 204 and a mirror 205 are disposed along the edges of the touch area 203. Because the camera 201 and the mirror image of the camera 201 are located at the symmetry positions with respect to the mirror 205, this configuration is substantially equal to a two-camera configuration. The linear light source 204 lightens the entire touch area 203 and the mirror 205 reflects light beams to the camera 201. When a touch object touches the touch area 203 to produce a touch point 207, the touch object blocks the light beams of the two directions reflected from the mirror 205 to the camera 201, and accordingly the camera 201 obtains two dark points at two positions on the pixel array of an image sensor provided in the camera 201. Finally, a processor 206 acquires the direction of the touch point 207 with respect to the camera 201 and calculates the real position of the touch point 207, according to the two positions of the two dark points on the pixel array of the image sensor provided in the camera 201.

However, no matter if the configuration has two cameras and a retro-reflector or a camera and a mirror, the manufacturing cost is high. Therefore, the purpose of the invention is to provide an optical touch system and an optical touch-position detection method adopting only one camera to detect touch positions. Therefore, components such as a linear light source, a mirror, and a retro-reflector are not necessary in the optical touch system of the invention. The manufacturing cost on an optical touch system is reduced.

BRIEF SUMMARY OF THE INVENTION

A detailed description is given in the following embodiments with reference to the accompanying drawings.

In order to lower the manufacturing cost, the present invention provides an optical touch system, including: a camera having a lens and an image sensor to capture an image of a touch object on the image sensor through the lens; an active light source for lighting the touch object; a processor for determining the distance between the touch object and the camera according to the size or brightness of the image on the image sensor, determining the direction of the touch object according to the position of the image on the image sensor, and calculating the position of the touch object; and a touch interface where the touch object performs a touch operation, wherein the camera is disposed at the periphery of the touch interface such that the field of view of the camera covers any position on the touch interface.

In the optical touch system, the active light source is disposed on the camera and provides light with enough intensity such that the light omitted from the active light source can be reflected by the touch object to the camera.

According to an embodiment of the invention, the active light source is an infrared light-emitting diode or an infrared light laser diode, and the image sensor is capable of detecting infrared light images.

According to an embodiment of the invention, the size of the image on the image sensor is represented by the number of pixels occupied by the image. When the processor determines the distance between the touch object and the camera according to the size of the image on the image sensor, the following equation is used:

$$W1/W2 = D2/D1,$$

wherein D1 and D2 are the distances between the touch object and the camera, and W1 and W2 are the widths of the images of the touch object which is at the distance D1 and D2 from the camera, respectively.

According to an embodiment of the invention, the brightness of the image on the image sensor is represented by the gray level of the image. When the processor determines the distance between the touch object and the camera according to the brightness of the image on the image sensor, the following equation is used:

$$L1/L2 = (D2/D1)^2,$$

wherein D1 and D2 are the distances between the touch object and the camera, and L1 and L2 are the brightness of the images of the touch object which is at the distance D1 and D2 from the camera, respectively.

According to an embodiment of the invention, the direction of the touch object is represented by an angle between a predetermined reference line and a line passing the position of the touch object and the camera, wherein the processor determines the angle according to the pixel of the image sensor where the center of the image is located.

The present invention also provides an optical touch-position detection method, including: using a camera provided with an image sensor to receive at least one image of a touch object; determining the distance between the touch object and the camera according to the size or brightness of the image on the image sensor; determining the direction of the touch object according to the position of the image on the image sensor, and calculating the position of the touch object from the distance and the direction.

In the optical touch-position detection method, the size of the image on the image sensor is represented by the number of pixels occupied by the image and the brightness of the image on the image sensor is represented by the gray level of the image. In addition, the position of the image on the image sensor is represented by the pixel of the image sensor where the center of the image is located.

According to the optical touch system and the optical touch-position detection method of the invention, only one camera detects touch positions, and an active light source fixed on the camera lightens a touch object such that the camera receives the light beam reflected from the touch object to capture an image. Therefore, the components of the conventional optical touch system such as a linear light source, a mirror, and a retro-reflector can be removed. In comparison to the prior art, the manufacturing cost on an optical touch system is reduced.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
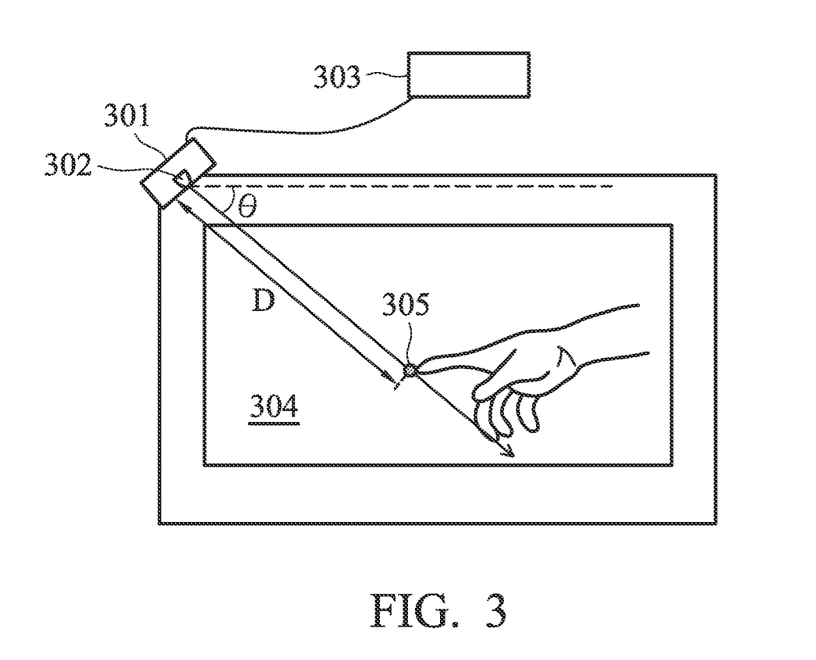
FIG. 3 is a configuration diagram showing an optical touch system in accordance with an embodiment of the invention.

FIG. 3 is a configuration diagram showing an optical touch system in accordance with an embodiment of the invention. As shown in FIG. 3, the optical touch system of the embodiment comprises a camera 301, an active light source 302 and a processor 303. The camera 301 is disposed at a corner of a touch area 304, such that the field of view of the camera 301 can cover the entire touch area 304. The active light source 302 is fixed on the camera 301 to lighten the touch object located on the touch area 304. The touch object reflects the light beam omitted from the active light source 302 to the camera 301. The processor 303 is used for calculating the position of the touch point 305 of the touch object.

Next, a touch-position detection method applied to this optical touch system is described. As shown in FIG. 3, the distance between the touch point 305 and the camera 301 (for simplicity, a distance or a distance of the touch object is called in the following description) is D, and the angle between a line passing through the touch point 305 and the camera 301 and an edge of the touch area 304 (for simplicity, an angle or an angle of the touch object is called in the following description) is θ. As long as the distance D and the angle θ are obtained, a specific position of the touch point 305 on the touch area 304 is determined. The methods for acquiring the distance D and the angle θ are described in order in the following.

Figure 4:
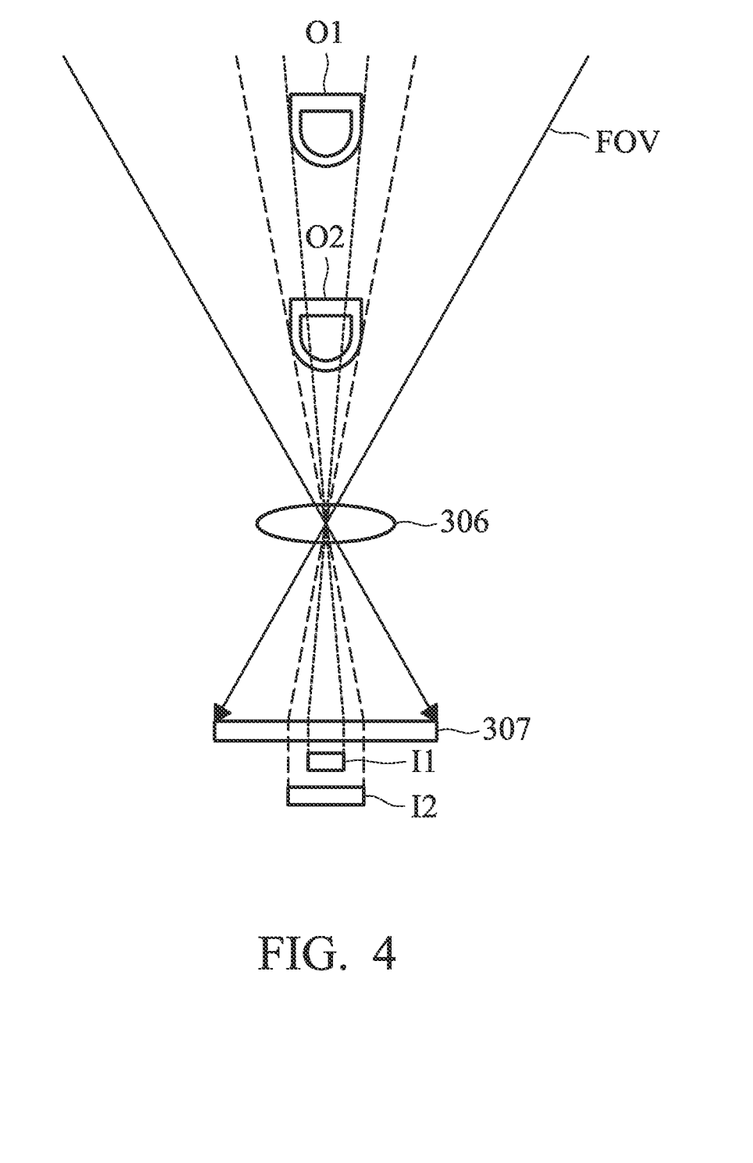
FIG. 4 is a diagram for explaining the distance-acquisition method of the optical touch system shown in FIG. 3.

FIG. 4 is a diagram for explaining the distance-acquisition method of the optical touch system shown in FIG. 3. The camera 301 comprises a lens 306 and an image sensor 307. The arrangement of the lens 306 and the image sensor 307 determines the field of view FOV of the camera 301. In the field of view FOV, a touch object O1 forms an image I1 on the image sensor 307 via the lens 306, and a touch object O2 forms an image I2 on the image sensor 307 via the lens 306. In the invention, there are two ways to acquire the distance of a touch object: determining the distance according to the size of the image and determining the distance according to the brightness of the image.

In the case where the size of the image is used to determine the distance, the touch object O1 which is far from the lens 306 forms the small image I1 on the image sensor 307 and the touch object O2 which is close to the lens 306 forms the large image I2 on the image sensor 307. Therefore, the distance between a touch object and the camera 301 can be determined by the number of pixels possessed by the image on the image sensor 307 (Namely, the width of the image).

Figure 5:
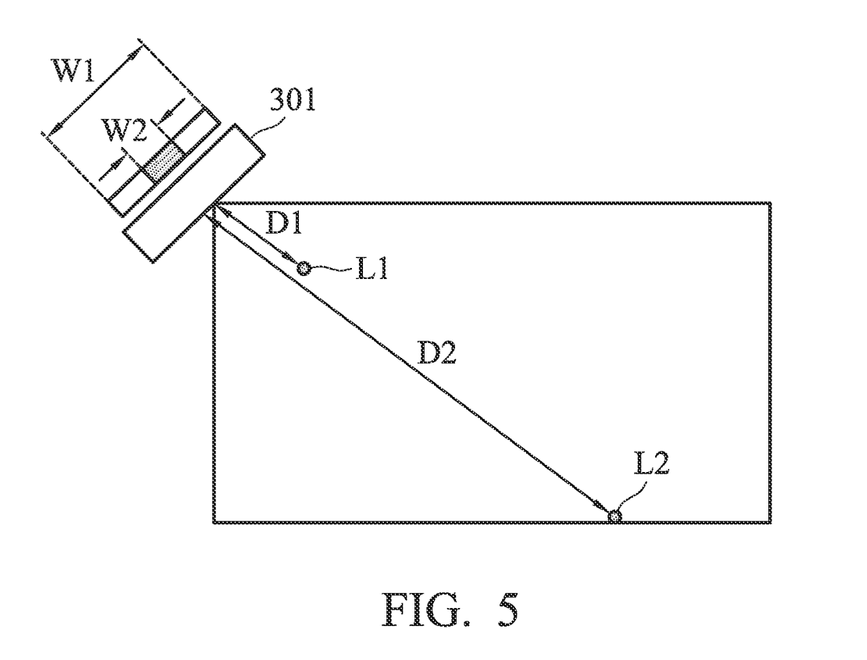
FIG. 5 is a diagram for explaining a distance-acquisition method in accordance with an embodiment of the invention.

FIG. 5 is a diagram for explaining a distance-acquisition method in accordance with an embodiment of the invention. As shown in FIG. 5, assuming that an image with a width W1 is formed on the image sensor 307 when the distance between a touch object and the camera 301 is D1 and an image with a width W2 is formed on the image sensor 307 when the distance between the touch object and the camera 301 is D2. According to the rules of geometry, the width of the image is inversely proportional to the distance of the touch object. Therefore, an equation for the four parameters is obtained.

$$W1/W2 = D2/D1 \qquad (1)$$

According to Equation (1), as long as a given distance of the touch object and the corresponding width of the image (the number of pixels possessed by the image) are stored in the processor 303 in advance, any distance of the touch object can be acquired from the width of its image.

Back to FIG. 4, in the case where the brightness of the image is used to determine the distance, the touch object O1 which is far from the lens 306 forms the darker image I1 on the image sensor 307 (because the amount of reflected right is less) and the touch object O2 which is close to the lens 306 forms the brighter image I2 on the image sensor 307 (because the amount of reflected right is greater). Therefore, the distance between a touch object and the camera 301 can be determined by the gray level of the image on the image sensor 307 (Namely, the brightness of the image).

As shown in FIG. 5, assuming that an image with brightness L1 is formed on the image sensor 307 when the distance between a touch object and the camera 301 is D1 and an image with brightness L2 is formed on the image sensor 307 when the distance between the touch object and the camera 301 is D2. Because the brightness of the image is inversely proportional to the square of the distance of the touch object, an equation for the four parameters is obtained.

$$L1/L2=(D2/D1)^2 \qquad (2)$$

According to Equation (2), as long as a given distance of the touch object and the corresponding brightness of the image (the gray level of the image) are stored in the processor 303 in advance, any distance of the touch object can be acquired from the brightness of its image.

Two methods for acquiring the distance of the touch object are described above. Next, a method for acquiring the direction of the touch object is described.

As described above, the camera 301 comprises a lens 306 and an image sensor 307. Therefore, a touch object located at a position with a specific angle θ forms an image at a corresponding pixel position on the image sensor 307. This characteristic can be utilized such that the angle θ of the touch object is derived from the pixel position, on the image sensor 307, of the image of the touch object.

Figure 6:
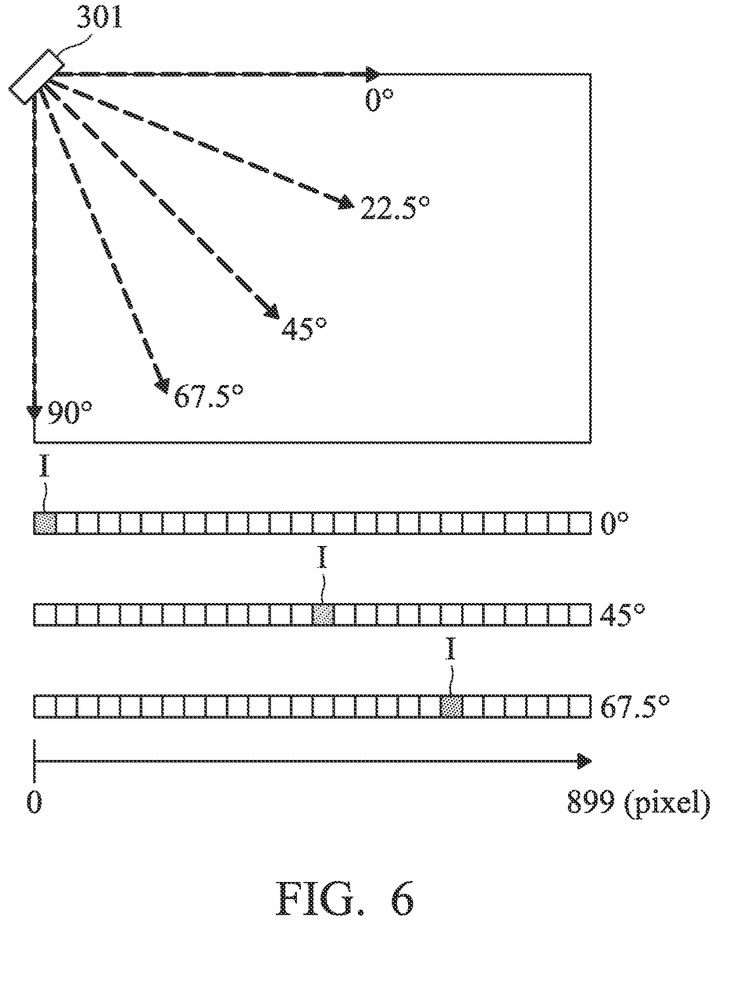
FIG. 6 is a diagram for explaining the angle-acquisition method of the optical touch system shown in FIG. 3.

FIG. 6 is a diagram for explaining the angle-acquisition method of the optical touch system shown in FIG. 3. Assuming that the field of view of the camera 301 is 90° which exactly covers the entire touch area 304 and the image sensor 307 has 900 pixels (pixel number 0~899). In this case, the pixel position of the image shifts one pixel as the angle θ of the touch object is varied by 0.1°. As shown in FIG. 6, when the angle θ of the touch object is 0° the image I is located at the $0^{th}$ pixel position; when the angle θ of the touch object is 45° the image I is located at the $450^{th}$ pixel position; and when the angle θ of the touch object is 67.5° the image I is located at the $675^{th}$ pixel position.

According to the above method, the pixel position of the image is used to derive the angle θ of the touch object. Note that the field of view of the camera is not limited to 90° and the total number of pixels is not limited to 900. FIG. 6 is just an example for easy understanding.

When the distance D and the angle θ of the touch object are obtained, a unique position on the touch area 304 is determined. After understanding the touch-position detection method for the optical touch system in accordance with the embodiment of the invention, an example will explain the procedure of the touch-position detection operation of the optical touch system with reference to FIGS. 7-10.

Figure 7:
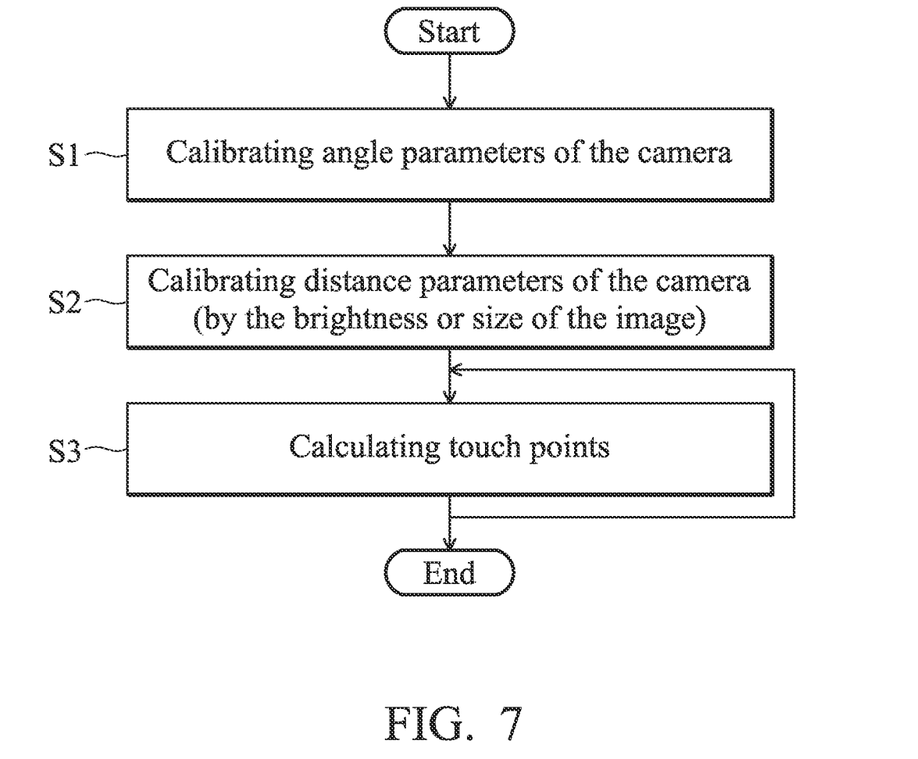
FIG. 7 is a flowchart for explaining the touch-position detection operation of the optical touch system.
Figure 8:
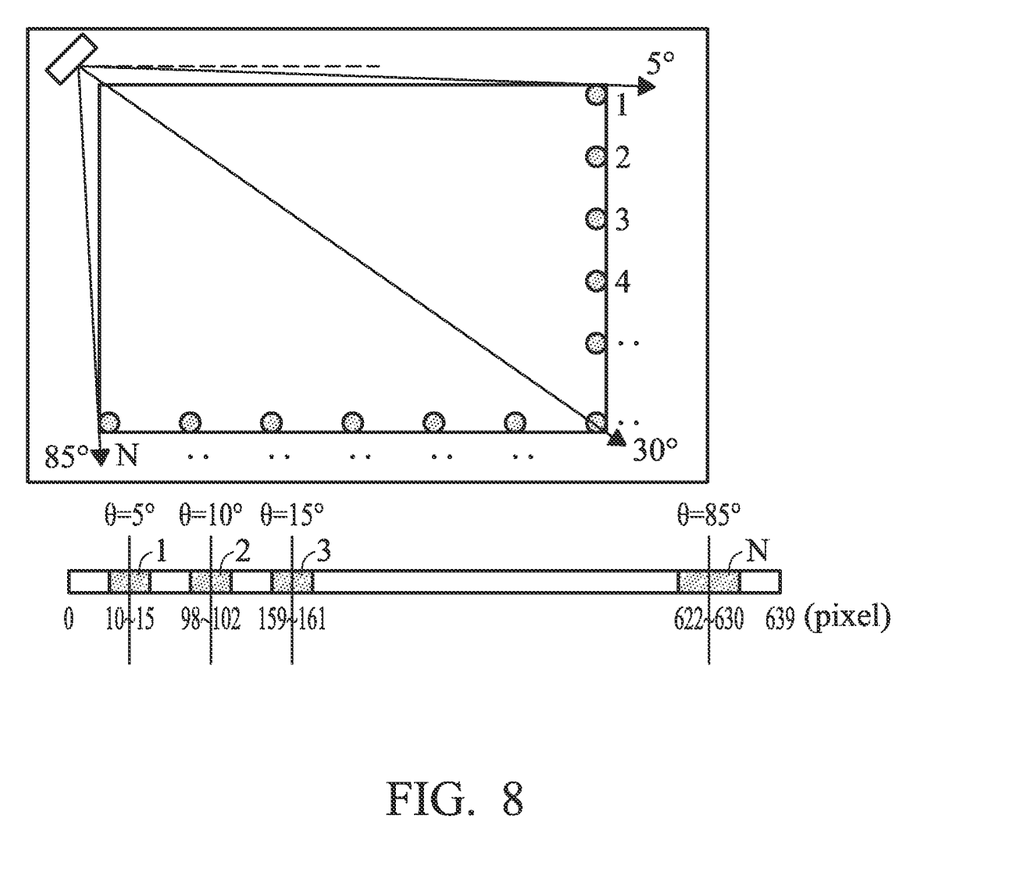
FIG. 8 is a diagram for explaining the calibration for angle parameters of the camera.
Figure 9:
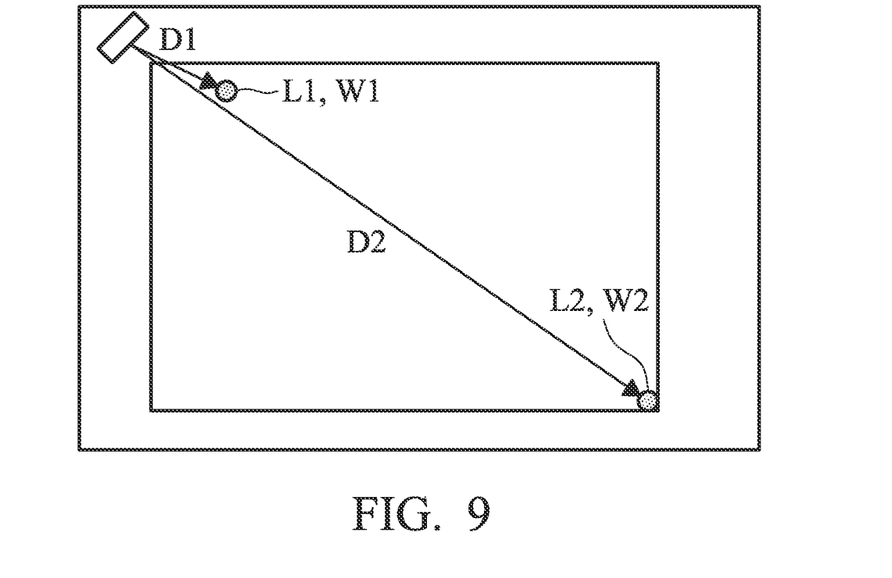
FIG. 9 is a diagram for explaining the calibration for distance parameters of the touch object.
Figure 10:
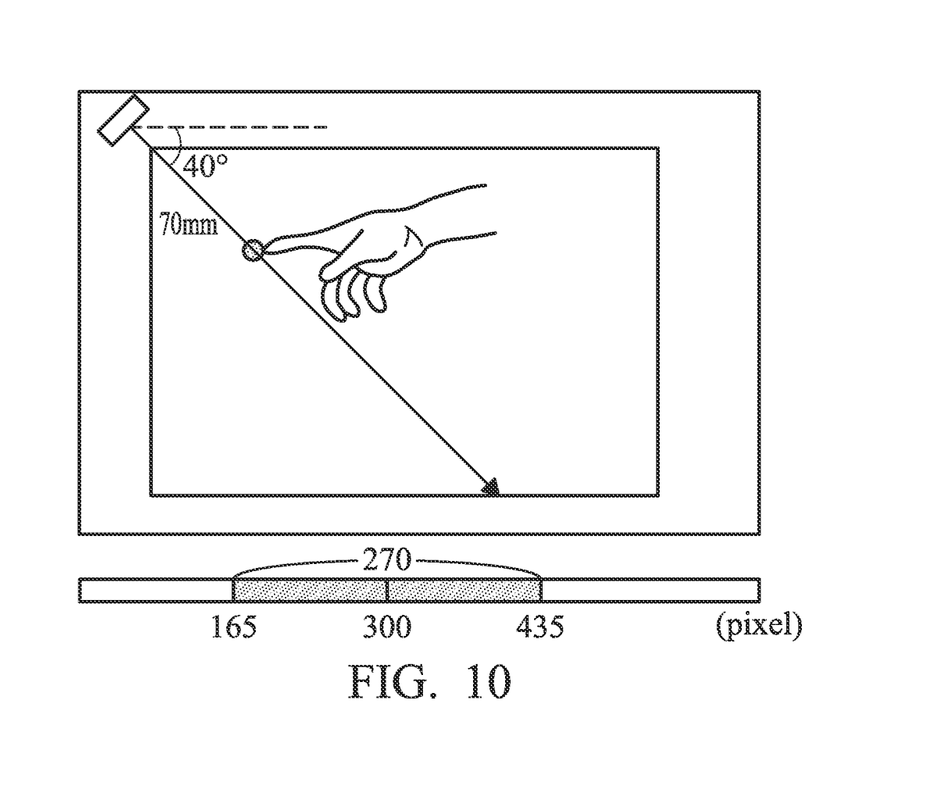
FIG. 10 is a diagram for explaining the calculation for obtaining a touch position.

FIG. 7 is a flowchart for explaining the touch-position detection operation of the optical touch system. FIG. 8 is a diagram for explaining the calibration for angle parameters of the camera. FIG. 9 is a diagram for explaining the calibration for distance parameters of the touch object. FIG. 10 is a diagram for explaining the calculation for a touch position.

First, proceeding with step S1: calibrating the angle parameters of the camera. The edge of the touch area far from the camera is divided into numerous calibration reference points, and the center pixel position on the image sensor corresponding to each calibration reference point is recorded.

As shown in FIG. 8, from the upper right corner to the lower left corner of the touch area, calibration reference points 1~N having their own predetermined angles θ (Namely, the angle between the upper edge of the touch area and a line passing through a calibration reference point and the camera) are located along the right edge and the lower edge of the touch area. Then, a touch object is used to touch at least one calibration reference point and the center pixel position of the image corresponding to the calibration reference point touched by the touch object is recorded. For example, for an image sensor having 640 pixels in total, the center position of the image of the touch object located at the calibration reference point 1 is located at the $12.5^{th}$ pixel position; the center position of the image of the touch object located at the calibration reference point 2 is located at the $100^{th}$ pixel position; the center position of the image of the touch object located at the calibration reference point 3 is located at the $160^{th}$ pixel position; the center position of the image of the touch object located at the calibration reference point N is located at the $626^{th}$ pixel position. In this way, an angle-to-image-position curve is obtained according to the angle of each calibration reference point and the pixel position of the corresponding image.

Next, proceeding with step S2: calibrating the distance parameters of the camera. Some positions on the touch area with different distances to the camera are set as calibration reference points, and the size or brightness of the image corresponding to each calibration reference point is recorded.

As shown in FIG. 9, two positions on the touch area with different distances to the camera are set as calibration reference points (a calibration reference point having a distance D1 to the camera and a calibration reference point having a distance D2 to the camera). Then a touch object is used to touch at least one calibration reference point and the size (W1 and W2) or brightness (L1 and L2) of the image corresponding to the calibration reference point touched by the touch object is recorded. For example, the brightness of the image of the touch object located at the calibration reference point which is 30 mm away from the camera is the $1000^{th}$ gray level; the brightness of the image of the touch object located at the calibration reference point which is 70 mm away from the camera is the $183.67^{th}$ gray level; and the brightness of the image of the touch object located at the calibration reference point which is 100 mm away from the camera is the $90^{th}$ gray level. Otherwise, for example, the size of the image of the touch object located at the calibration reference point which is 30 mm away from the camera is 630 pixels; the size of the image of the touch object located at the calibration reference point which is 70 mm away from the camera is 270 pixels; and the size of the image of the touch object located at the calibration reference point which is 100 mm away from the camera is 189 pixels. In this way, a distance-to-image-brightness curve is obtained according to the distance of each calibration reference point and the corresponding image brightness, or a distance-to-image-size curve is obtained according to the distance of each calibration reference point and the corresponding image size.

Finally, proceeding with step S3: calculating the touch position. In this step, the user performs a normal touch operation. The optical touch system determines the angle of the touch object according to the pixel position of the image of the touch object and the distance of the touch object according to the brightness or size of the image of the touch object. After a touch position is calculated, step S3 is repeated if the user continues the touch operation.

For example, as shown in FIG. 10, assuming that the touch object touches the touch area and forms an image on the image sensor, wherein the center position of the image is at the $300^{th}$ pixel and the width of the image is 270 pixels (spanning from the $165^{th}$ pixel to the $435^{th}$ pixel). Therefore, according to the angle-to-image-position curve it can be known that the touch point is located in the direction of angle 40°, and according to the distance-to-image-size curve it can be known that the touch point is located 70 mm from the camera. The processor determines a touch position of the touch point from the angle value and the distance value.

The optical touch system and the optical touch-position detection method are described above. However, different touch objects have different characteristics such as different thicknesses. In this case, before a normal touch operation, the touch object can touch at least one specified reference point on the touch area in advance for angle and distance calibration. In this way, the calculation for touch position becomes more accurate during normal touch operations.

According to the optical touch system and the optical touch-position detection method of the invention, only one camera detects touch positions, and an active light source fixed on the camera lightens a touch object such that the camera receives the light beam reflected from the touch object to capture an image. Therefore, the components of the conventional optical touch system such as a linear light source, a mirror, and a retro-reflector can be removed. In comparison to the prior art, the manufacturing cost on an optical touch system is reduced.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements. For example, the active light can be an infrared light-emitting diode or an infrared light laser diode. In this case, the image sensor must be capable of detecting infrared light images. Moreover, a camera provided with a lens is described in the embodiment, but the lens can be replaced by a lens group consisting of a plurality of lenses.

What is claimed is:

1. An optical touch system, comprising:
a camera, having a lens and an image sensor to capture an image of a touch object on the image sensor through the lens;
an active light source for lighting the touch object;
a processor for determining the distance between the touch object and the camera according to the size or brightness of the image on the image sensor, determining the direction of the touch object according to the position of the image on the image sensor, and calculating the position of the touch object; and
a touch interface where the touch object performs a touch operation,
wherein the camera is disposed at a periphery of the touch interface such that a field of view of the camera covers any position on the touch interface, and
when the processor determines the distance between the touch object and the camera according to the size of the image on the image sensor, the following equation is used:

$$W1/W2=D2/D1,$$

wherein D1 and D2 are the distances between the touch object and the camera, and W1 and W2 are widths of the images of the touch object which is at the distance D1 and D2 from the camera, respectively.

2. The optical touch system as claimed in claim 1, wherein the active light source is disposed on the camera and provides light with enough intensity such that the light omitted from the active light source can be reflected by the touch object to the camera.

3. The optical touch system as claimed in claim 2, wherein the active light source is an infrared light emitting diode or an infrared light laser diode, and the image sensor is capable of detecting infrared light images.

4. The optical touch system as claimed in claim 1, wherein the direction of the touch object is represented by an angle between a predetermined reference line and a line passing the position of the touch object and the camera,
wherein the processor determines the angle according to the pixel of the image sensor where the center of the image is located.

5. An optical touch-position detection method, comprising:
using a camera provided with an image sensor to receive at least one image of a touch object;
determining the distance between the touch object and the camera according to the size or brightness of the image on the image sensor;
determining the direction of the touch object according to the position of the image on the image sensor, and
calculating the position of the touch object from the distance and the direction,
wherein when the distance between the touch object and the camera is determined according to the size of the image on the image sensor, the following equation is used:

$$W1/W2=D2/D1,$$

wherein D1 and D2 are the distances between the touch object and the camera, and W1 and W2 are widths of the images of the touch object which is at the distance D1 and D2 from the camera, respectively.

6. The optical touch-position detection method as claimed in claim 5, wherein the position of the image on the image sensor is represented by the pixel of the image sensor where the center of the image is located.

7. An optical touch system, comprising:
a camera, having a lens and an image sensor to capture an image of a touch object on the image sensor through the lens;
an active light source for lighting the touch object;
a processor for determining the distance between the touch object and the camera according to the size or brightness of the image on the image sensor, determining the direction of the touch object according to the position of the image on the image sensor, and calculating the position of the touch object; and
a touch interface where the touch object performs a touch operation,
wherein the camera is disposed at the periphery of the touch interface such that the field of view of the camera covers any position on the touch interface, and
when the processor determines the distance between the touch object and the camera according to the brightness of the image on the image sensor, the following equation is used:

$$L1/L2=(D2/D1)^2,$$

wherein D1 and D2 are the distances between the touch object and the camera, and L1 and L2 are the brightness of the images of the touch object which is at the distance D1 and D2 from the camera, respectively.

8. The optical touch system as claimed in claim 7, wherein the active light source is disposed on the camera and provides light with enough intensity such that the light omitted from the active light source can be reflected by the touch object to the camera.

9. The optical touch system as claimed in claim 8, wherein the active light source is an infrared light emitting diode or an infrared light laser diode, and the image sensor is capable of detecting infrared light images.

10. The optical touch system as claimed in claim 7, wherein the direction of the touch object is represented by an angle between a predetermined reference line and a line passing the position of the touch object and the camera,
   wherein the processor determines the angle according to the pixel of the image sensor where the center of the image is located.

11. An optical touch-position detection method, comprising:
   using a camera provided with an image sensor to receive at least one image of a touch object;
   determining the distance between the touch object and the camera according to the size or brightness of the image on the image sensor;
   determining the direction of the touch object according to the position of the image on the image sensor, and
   calculating the position of the touch object from the distance and the direction,
   wherein when the distance between the touch object and the camera is determined according to the brightness of the image on the image sensor, the following equation is used:

$$L1/L2 = (D2/D1)^2,$$

wherein D1 and D2 are the distances between the touch object and the camera, and L1 and L2 are the brightness of the images of the touch object which is at the distance D1 and D2 from the camera, respectively.

12. The optical touch-position detection method as claimed in claim 11, wherein the position of the image on the image sensor is represented by the pixel of the image sensor where the center of the image is located.

* * * * *